US011944996B2

(12) United States Patent
Goichman et al.

(10) Patent No.: US 11,944,996 B2
(45) Date of Patent: Apr. 2, 2024

(54) SYSTEM AND METHOD FOR COATING SUBSTRATES

(71) Applicant: Orbotech Ltd., Yavne (IL)

(72) Inventors: Tal Goichman, Kiryat Ono (IL); Ashkan Aghajani, Beersheva (IL)

(73) Assignee: Orbotech Ltd., Yavne (IL)

( * ) Notice: Subject to any disclaimer, the term of this patent is extended or adjusted under 35 U.S.C. 154(b) by 12 days.

(21) Appl. No.: 17/413,942

(22) PCT Filed: Jan. 6, 2020

(86) PCT No.: PCT/IL2020/050015
§ 371 (c)(1),
(2) Date: Jun. 14, 2021

(87) PCT Pub. No.: WO2020/144673
PCT Pub. Date: Jul. 16, 2020

(65) Prior Publication Data

US 2022/0080453 A1 Mar. 17, 2022

Related U.S. Application Data

(60) Provisional application No. 62/791,814, filed on Jan. 13, 2019.

(51) Int. Cl.
*B05C 11/04* (2006.01)
*B05D 1/42* (2006.01)

(52) U.S. Cl.
CPC .......... *B05C 11/041* (2013.01); *B05C 11/044* (2013.01); *B05C 11/045* (2013.01); *B05D 1/42* (2013.01)

(58) Field of Classification Search
CPC ... B05C 11/044; B05C 11/023; B05C 11/026; B05C 11/028; B05C 11/04;
(Continued)

(56) References Cited

U.S. PATENT DOCUMENTS

| | | |
|---|---|---|
| 1,393,637 A | 10/1921 | Ohashi |
| 4,414,555 A | 11/1983 | Becker |

(Continued)

FOREIGN PATENT DOCUMENTS

| | | |
|---|---|---|
| CN | 101555543 A | 10/2009 |
| CN | 202620250 U | 12/2012 |

(Continued)

OTHER PUBLICATIONS

WIPO, International Search Report for PCT/IL2020/050015, dated Feb. 27, 2020.

(Continued)

*Primary Examiner* — Binu Thomas
(74) *Attorney, Agent, or Firm* — Hodgson Russ LLP

(57) ABSTRACT

A system for coating of a donor material onto a laser radiation transparent substrate, the system including a donor material applicator, applying donor material to the laser radiation transparent substrate, a multi-pass precise donor material thickness determiner for providing a desired thickness of the donor material on the laser radiation transparent substrate and including a linearly displaceable blade support, a layer thickness uniformizing blade lockably pivotably mounted onto the linearly displaceable blade support about a pivot axis, the blade having a straight edge and a blade position maintainer operative for maintaining the straight edge at a desired separation distance from the laser radiation transparent substrate, the separation distance being uniform along the straight edge of the layer thickness uniformizing blade.

16 Claims, 14 Drawing Sheets

(58) Field of Classification Search
CPC ..... B05C 11/041; B05C 11/042; B05C 11/02; B05C 11/021; B05D 1/42; B29C 64/214
USPC .................................. 118/100–126; 427/356
See application file for complete search history.

(56) References Cited

U.S. PATENT DOCUMENTS

| | | | |
|---|---|---|---|
| 4,608,328 | A | 8/1986 | Schwarz et al. |
| 4,869,200 | A | 9/1989 | Euverard |
| 5,090,828 | A | 2/1992 | Shimura et al. |
| 5,137,382 | A | 8/1992 | Miyajima |
| 5,204,696 | A | 4/1993 | Schmidlin et al. |
| 5,692,844 | A | 12/1997 | Harrison et al. |
| 5,885,929 | A | 3/1999 | Brock et al. |
| 6,276,275 | B1 | 8/2001 | Schaefer |
| 6,462,561 | B1 | 10/2002 | Bigelow et al. |
| 6,896,429 | B2 | 5/2005 | White et al. |
| 7,534,543 | B2 | 5/2009 | Kreilich et al. |
| 8,520,223 | B2 | 8/2013 | Bucher |
| 8,671,877 | B2 | 3/2014 | Hasegawa et al. |
| 8,691,323 | B2 | 4/2014 | Von Drasek et al. |
| 9,199,446 | B2 | 12/2015 | Nadrchal et al. |
| 9,388,530 | B2 | 7/2016 | Von Drasek et al. |
| 9,429,422 | B2 | 8/2016 | Bray et al. |
| 9,446,618 | B2 | 9/2016 | Batt |
| 2006/0078674 | A1 | 4/2006 | Ohara |
| 2011/0097550 | A1 | 4/2011 | Matusovsky et al. |
| 2015/0167147 | A1 | 6/2015 | Schupp et al. |
| 2015/0328838 | A1 | 11/2015 | Erb et al. |
| 2018/0134029 | A1* | 5/2018 | Myerberg ........... C04B 35/6264 |
| 2018/0200791 | A1* | 7/2018 | Redding ............... B29C 64/214 |

FOREIGN PATENT DOCUMENTS

| | | | |
|---|---|---|---|
| DE | 4325573 | * | 2/1995 |
| JP | H06316055 | A | 11/1994 |
| KR | 20110007336 | * | 7/2011 |
| TW | 201041080 | A | 11/2010 |
| WO | 2016124708 | A1 | 8/2016 |
| WO | 2016124712 | A2 | 8/2016 |

OTHER PUBLICATIONS

CNIPA, Office Action for CN Application No. 202080008421.2, dated Feb. 14, 2023 (see X/Y/A designations on p. 6).
CNIPA, Office Action for CN Application No. 202080008421.2, dated Jul. 25, 2022.
Grant-Jacob et al., "Micron-scale copper wires printed using femtosecond laser-induced forward transfer with automated donor replenishment," Optical Materials Express, Jun. 1, 2013, pp. 747-754, vol. 3, No. 6.
Eason et al., "Nanofabrication technologies: high-throughput for tomorrow's metadevices," University of Southampton, Optoelectronics Research Centre, 2014.
Xiao, "Nanosecond Laser Assisted Fabrication of Large Area Metallic Nanostructures and Their Potential Applications; A dissertation submitted in partial satisfaction of the requirements for the degree Doctor of Philosophy in Mechanical Engineering," University of California, Los Angeles, 2015.

* cited by examiner

SYSTEM AND METHOD FOR COATING SUBSTRATES

FIELD OF THE INVENTION

The present invention relates to systems and methods for precisely coating a substrate with highly viscous material.

BACKGROUND OF THE INVENTION

Various types of systems and methods are known in the art for coating substrates.

SUMMARY OF THE INVENTION

The present invention seeks to provide an improved system and method for coating substrates with highly viscous material.

There is thus provided in accordance with a preferred embodiment of the present invention a method for coating of a donor material onto a laser radiation transparent substrate having a straight surface portion, the method including providing a layer thickness uniformizing blade pivotably mounted onto a linearly displaceable blade support about a pivot axis, the blade having a straight edge, initially positioning the linearly displaceable blade support relative to the laser radiation transparent substrate such that the straight edge lies coplanar with the straight surface portion of the laser radiation transparent substrate, wherein the straight surface portion lies along a blade engagement axis which is perpendicular to the pivot axis, thereafter locking the layer thickness uniformizing blade against pivotable movement relative to the linearly displaceable blade support about the pivot axis, thereafter repositioning the linearly displaceable blade support and the layer thickness uniformizing blade about a linear displacement axis which is perpendicular to the blade engagement axis and perpendicular to the pivot axis to a position at which the straight edge is separated from the straight surface portion of the laser radiation transparent substrate by a separation distance, which is uniform along the straight edge of the layer thickness uniformizing blade, applying the donor material to the laser radiation transparent substrate, providing mutual displacement between the layer thickness uniformizing blade and the laser radiation transparent substrate along an axis parallel to the pivot axis, thereby to reduce the thickness of the initial layer of the donor material and maintaining the separation distance.

Preferably, the method also includes sequentially repeating the repositioning and the providing mutual displacement steps at least once thereby to sequentially reduce the thickness of the donor material.

In accordance with a preferred embodiment of the present invention the providing mutual displacement includes reducing the thickness of the donor material to a thickness between 10 and 2000 microns.

In accordance with a preferred embodiment of the present invention the initially positioning the linearly displaceable blade support includes measuring a force exerted by the layer thickness uniformizing blade on the laser radiation transparent substrate. Additionally or alternatively, the initially positioning includes initially positioning the layer thickness uniformizing blade such that a portion of the straight edge of the blade touches the laser radiation transparent substrate, while the blade is free to pivot about the pivot axis. Additionally, the initially positioning further includes thereafter lowering the layer thickness uniformizing blade such that the straight edge lies in parallel touching engagement with the laser radiation transparent substrate, while the blade is free to pivot about the pivot axis. Preferably, the initially positioning further includes thereafter further lowering the layer thickness uniformizing blade until a measured three of the layer thickness uniformizing blade on the laser radiation transparent substrate is about 150 grams, while the straight edge of the layer thickness uniformizing blade lies in parallel touching engagement with the laser radiation transparent substrate and the layer thickness uniformizing blade remains free to pivot about the pivot axis.

In accordance with a preferred embodiment of the present invention the locking the layer thickness uniformizing blade against pivotable movement relative to the linearly displaceable blade support about the pivot axis is provided by operation of an electromagnet mounted onto the linearly displaceable blade support by attracting a locking arm, fixed to the layer thickness uniformizing blade.

Preferably, the repositioning takes place when the layer thickness uniformizing blade is not free to pivot about the pivot axis.

There is also provided in accordance with another preferred embodiment of the present invention a system for coating of a donor material onto a laser radiation transparent substrate, the system including a donor material applicator, applying donor material to the laser radiation transparent substrate, a multi-pass precise donor material thickness determiner for providing a desired thickness of the donor material on the laser radiation transparent substrate and including a linearly displaceable blade support, a layer thickness uniformizing blade lockably pivotably mounted onto the linearly displaceable blade support about a pivot axis, the blade having a straight edge and a blade position maintainer operative for maintaining the straight edge at a desired separation distance from the laser radiation transparent substrate, the separation distance being uniform along the straight edge of the layer thickness uniformizing blade.

In accordance with a preferred embodiment of the present invention the desired thickness of the donor material on the laser radiation transparent substrate is between 10 and 2000 microns.

In accordance with a preferred embodiment of the present invention the linearly displaceable blade support is linearly displaceable perpendicular to the pivot axis.

In accordance with a preferred embodiment of the present invention the linearly displaceable blade support also supports an electromagnet. Additionally, the electromagnet is selectable actuable for locking the layer thickness uniformizing blade relative to the linearly displaceable blade support against rotation of the layer thickness uniformizing blade about the pivot axis, when the straight edge of the layer thickness uniformizing blade is positioned at a desired separation distance from the laser radiation transparent substrate.

Preferably, the blade position maintainer includes a force sensor for sensing a force exerted by the layer thickness uniformizing blade on the laser radiation transparent substrate.

In accordance with a preferred embodiment of the present invention the multi-pass precise donor material thickness determiner also includes a linear displacer for linearly displacing the linearly displaceable blade support between sequential passes to sequentially reduce the thickness of the donor material until the desired thickness is reached.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
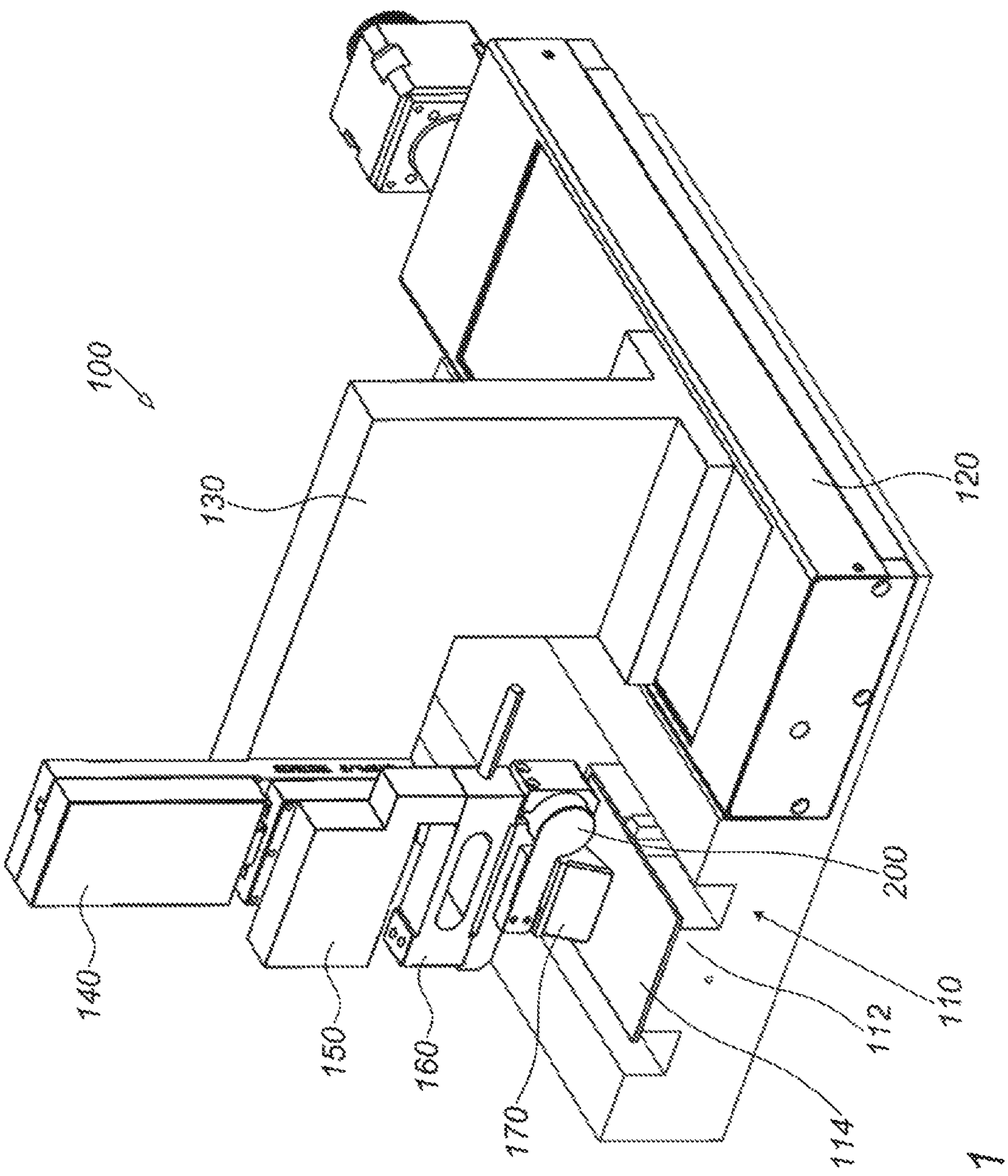
FIG. 1 is a simplified pictorial illustration of a coating system constructed and operative in accordance with a preferred embodiment of the present invention together with a typical substrate to be coated.
Figure 2:
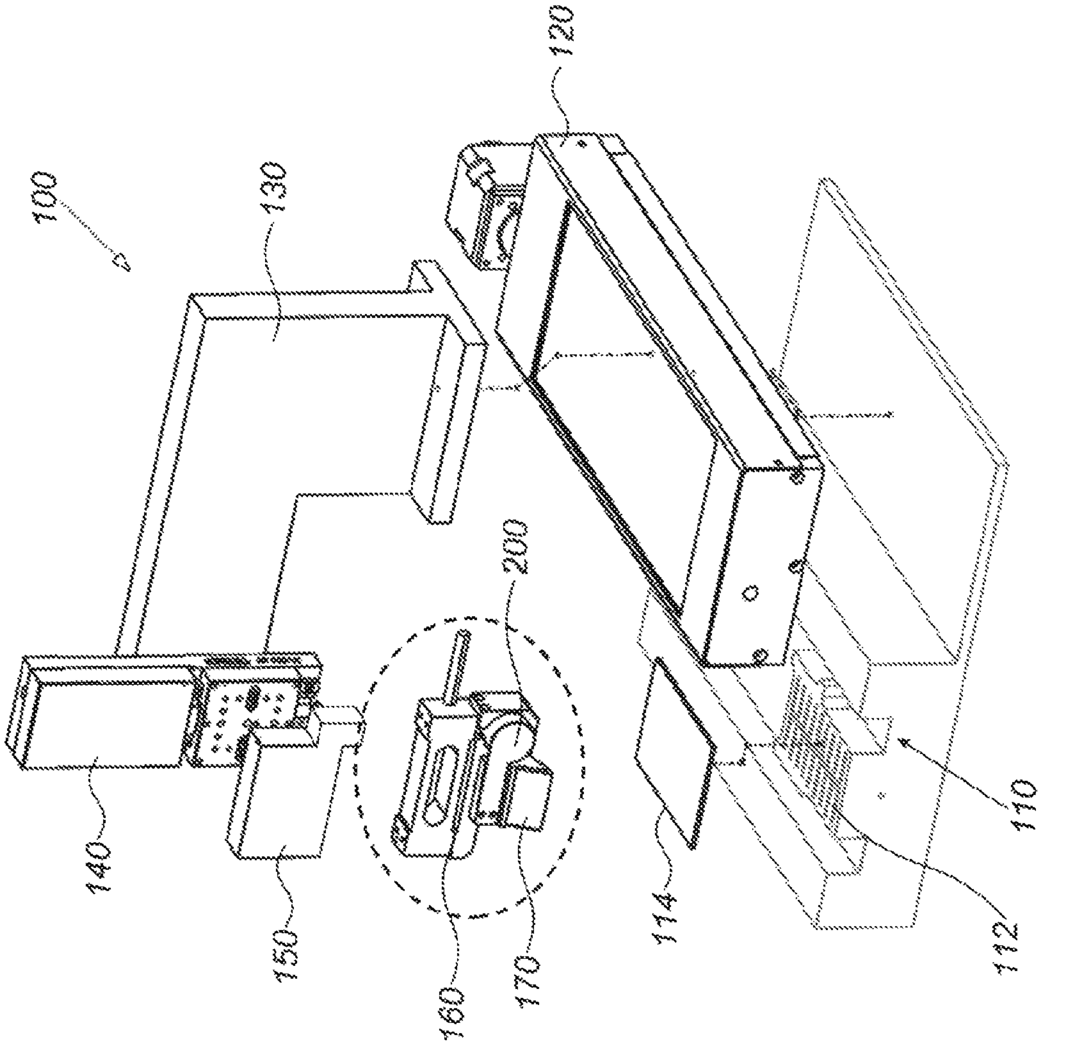
FIG. 2 is a simplified pictorial partially exploded view illustration of the coating system of FIG. 1.

Reference is now made to FIGS. 1 and 2, which are simplified pictorial illustrations of a coating system 100 constructed and operative in accordance with a preferred embodiment of the present invention together with a typical substrate to be coated.

As seen in FIGS. 1 & 2, the coating system preferably comprises a base assembly 110, which is typically static and which may include a conventional vacuum chuck 112 for selectably securely retaining thereon a flat substrate 114, preferably a laser radiation transparent substrate, preferably including a straight surffice portion to be coated. Base assembly 110 is preferably formed of 6061 T6 aluminum plate and machined to high parallelism between substrate plane and Y stage mounting plate.

Preferably mounted on base assembly 110 is a Y-axis positioner 120, such as a Thorlabs NRT-100, which in turn supports a Y-Z adapter arm 130, typically formed of 6061 T6 aluminum plate.

Preferably mourned onto Y-Z adapter arm 130 is a precise Z-axis positioner 140, such as a Thorlabs MTS25-Z8-25 mm, which in turn supports a mounting bracket 150, typically formed of 6061 T6 aluminum plate. Mounting bracket 150 supports a layer thickness uniformizing blade positioning subsystem 160.

Figure 3B:
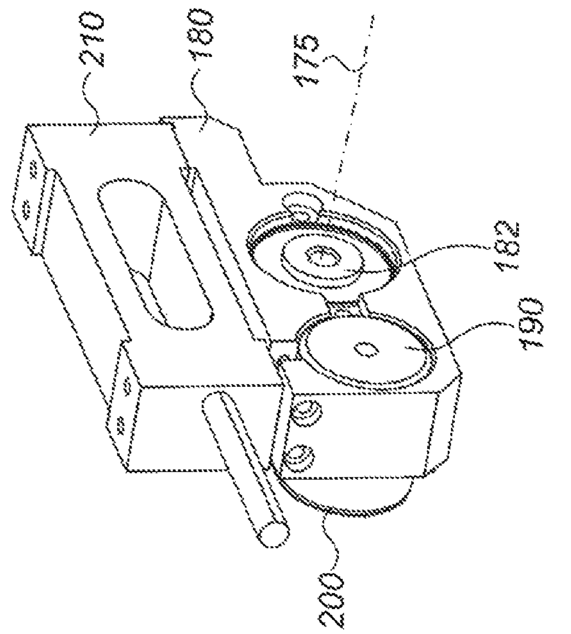
FIGS. 3A and 3B are simplified pictorial illustrations, taken in mutually different directions, of a layer thickness uniformizing blade positioning subsystem forming part of the coating system of FIGS. 1 and 2.
Figure 3A:
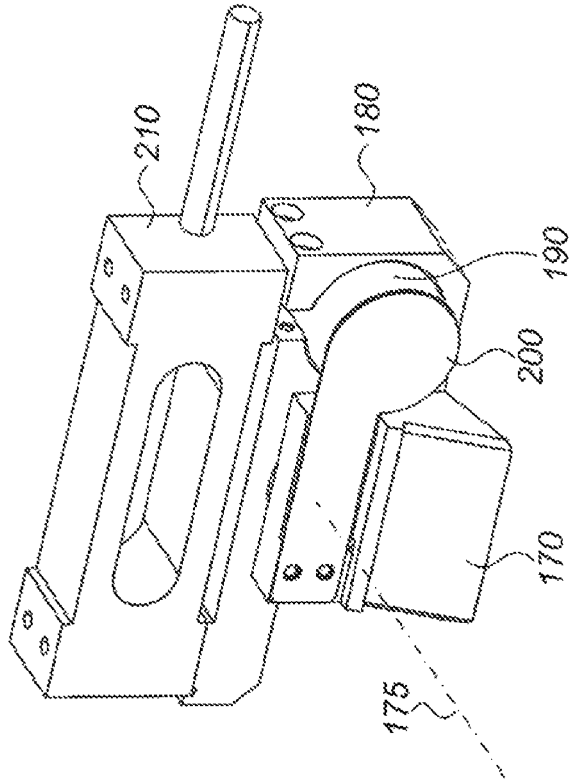
Figure 4A:
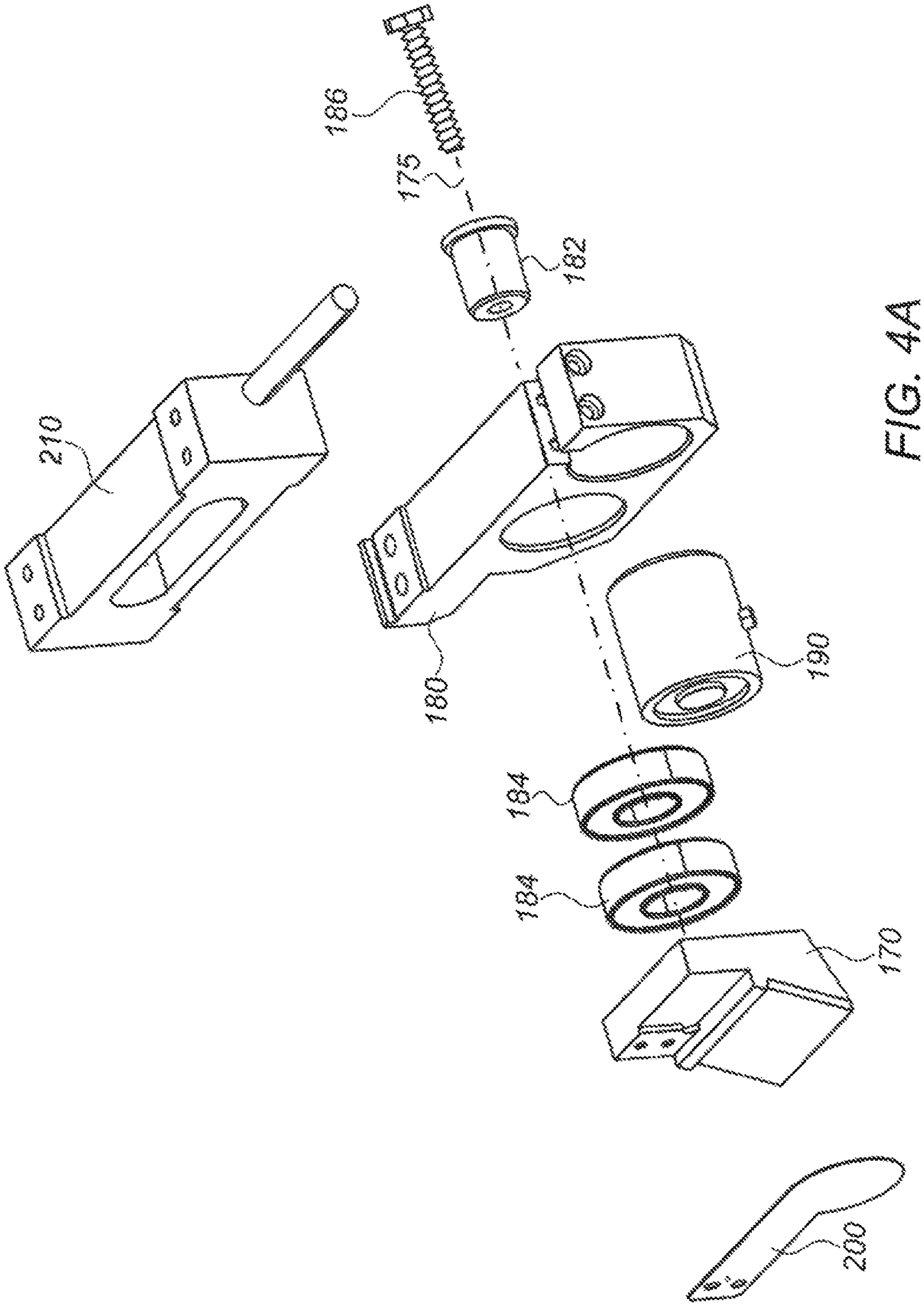
FIGS. 4A and 4B are simplified pictorial illustrations, taken in mutually different directions, of the layer thickness uniformizing blade positioning subsystem of FIGS. 3A & 3B.
Figure 4B:
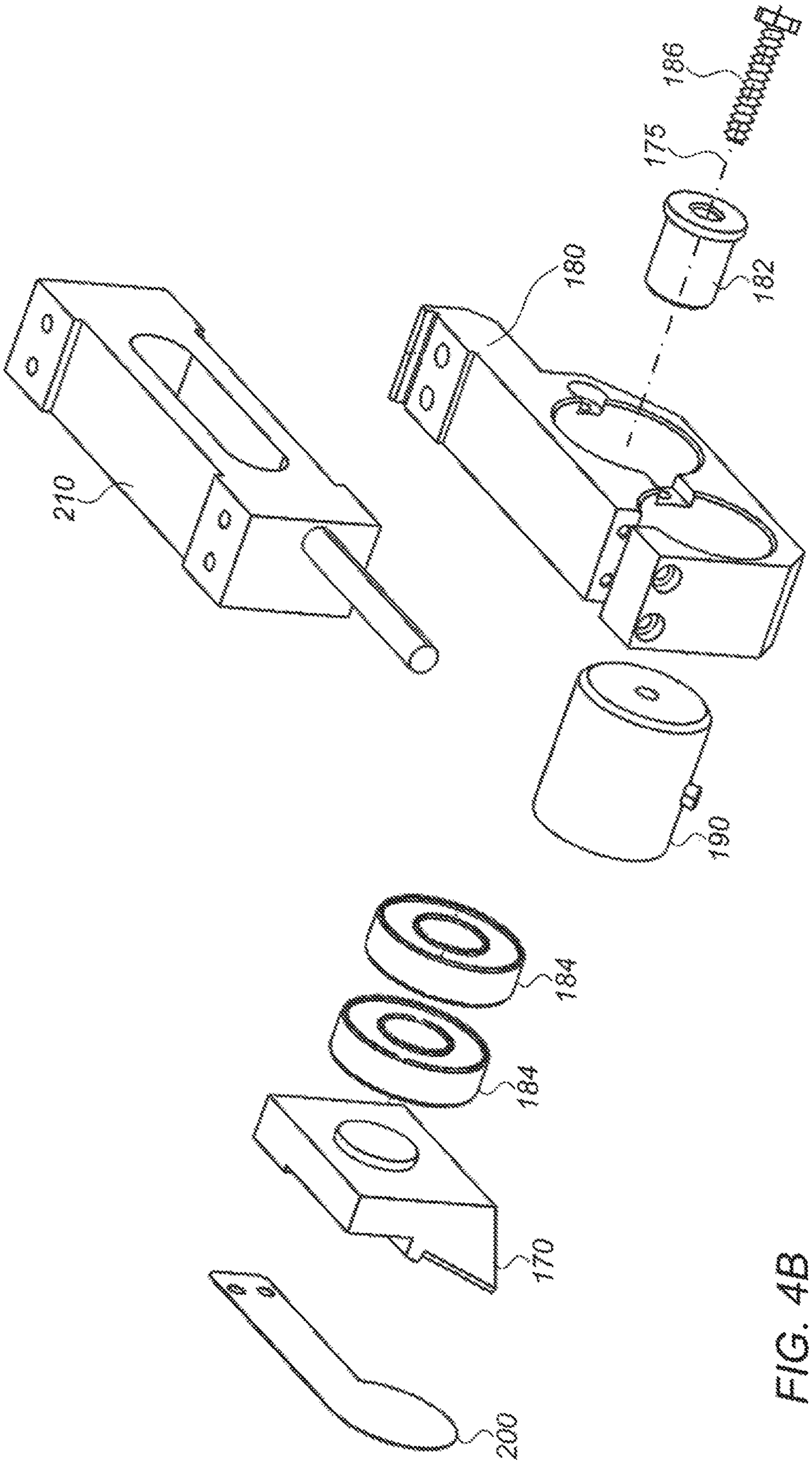
Figures 5A, 5B, 5C:
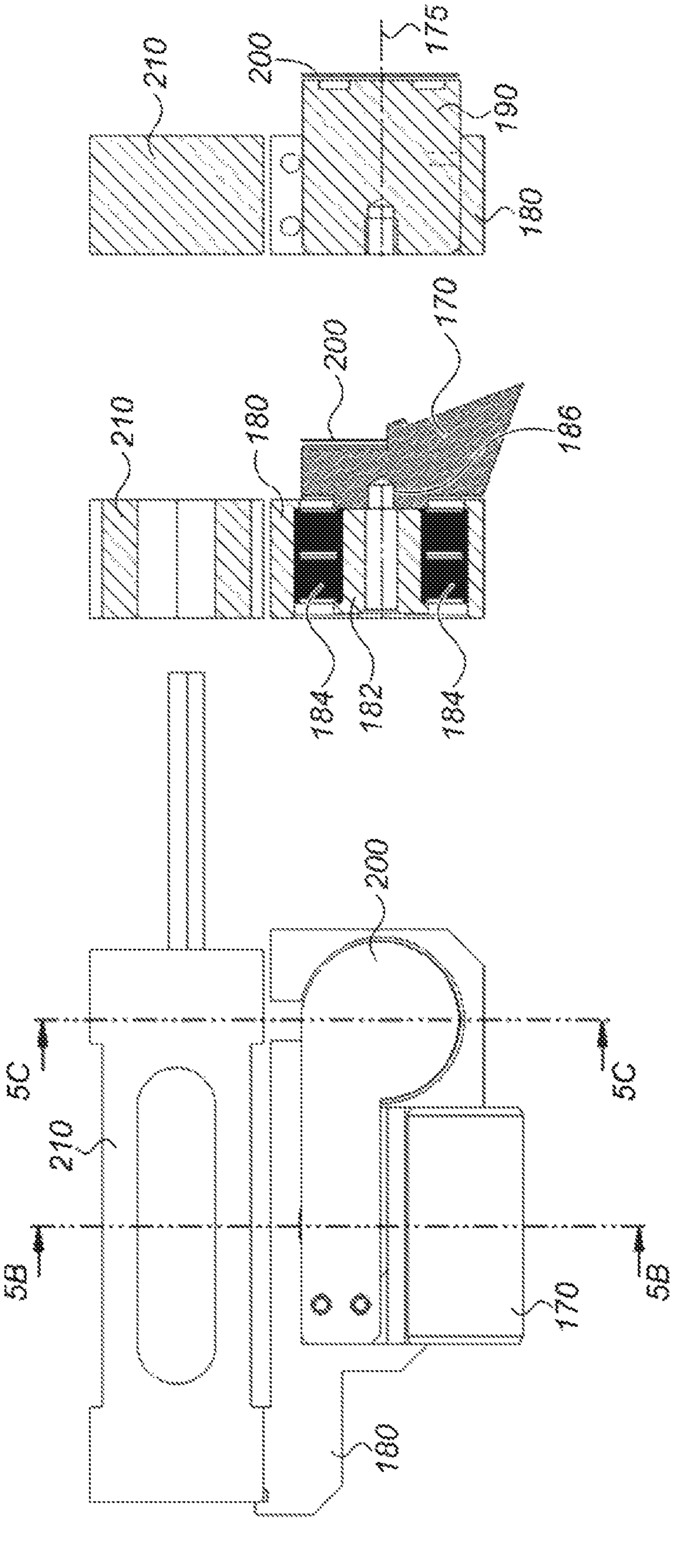
FIGS. 5A, 5B and 5C are simplified respective front planar view and first and second sectional illustrations of the layer thickness uniformizing blade positioning subsystem of FIGS. 3A-4B, FIGS. 5B and 5C, being taken along lines 5B-5B and 5C-5C in FIG. 5A.

Reference is now additionally made to FIGS. 3A-5C, which illustrate layer thickness uniformizing blade positioning subsystem 160. As seen in FIGS. 3A 5C, layer thickness uniformizing blade positioning subsystem 160 preferably includes a layer thickness uniformizing blade 170, preferably formed of 17-4HP steel, which is described in greater detail hereinbelow with reference to FIGS. 6A 6C.

Layer thickness uniformizing blade 170 is rotatably mounted, for rotation about an axis 175, onto a blade and electromagnet mounting bracket 180, described in greater detail hereinbelow with reference to FIGS. 7A & 7B, by means of an axle 182, described in greater detail hereinbelow with reference to FIGS. 8A & 8B, engaging a pair of rotary bearings 184, such as NSK Angular contact 7900 bearings. Axle 182 is fixed to blade 170 by means of a screw 186 along axis 175.

Blade and electromagnet mounting bracket 180 also supports an electromagnet 190, such as a Magnetech R-0515-12, which selectably lockably engages a locking arm 200, which is preferably formed of ferromagnetic sheet steel, such as 1020-1030. Locking arm 200 is selectably fixed, as by fasteners, not shown, onto layer thickness uniformizing blade assembly 170, such that locking of locking arm 200 by magnetic engagement thereof by electromagnet 190, fixes the angular orientation of layer thickness uniformizing blade 170 about axis 175.

Blade and electromagnet mounting bracket 180 is mounted, as by fasteners, not shown, onto a force sensor 210, such as a VISHAY LPS Loadcell, which is in turn supported by mounting bracket 150.

Figure 6C:
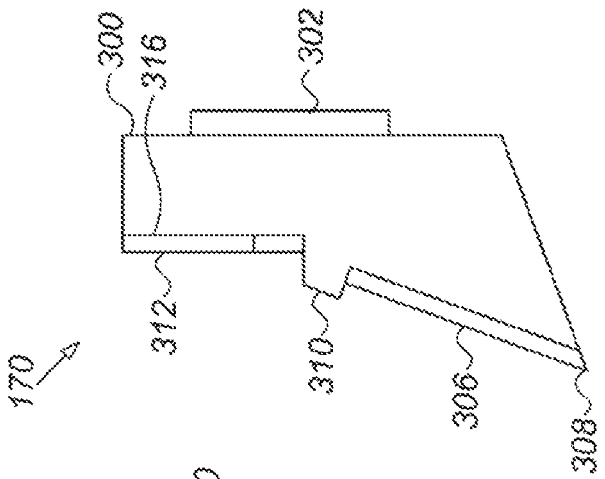
FIGS. 6A, 6B and 6C are simplified respective first and second pictorial and side view illustrations of a layer thickness uniformizing blade forming part of the layer thickness uniformizing blade positioning subsystem of FIGS. 3A-4B.
Figure 6B:
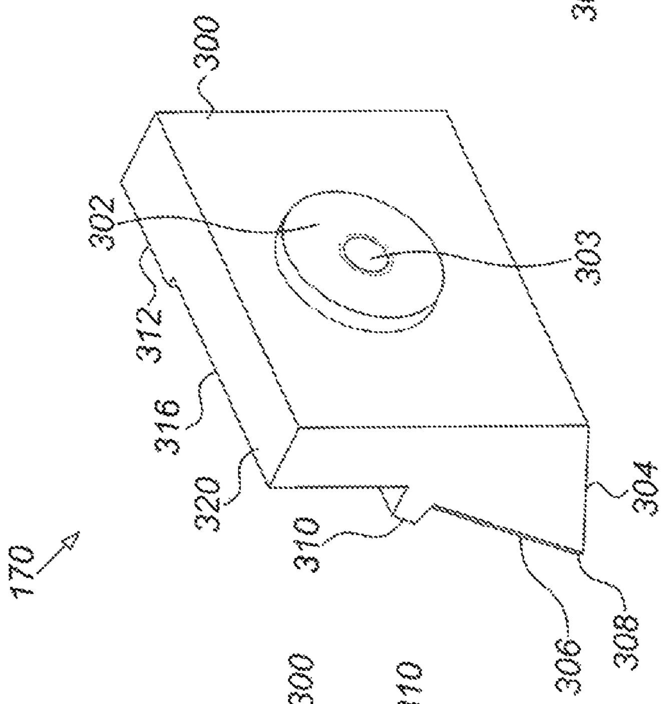
Figure 6A:
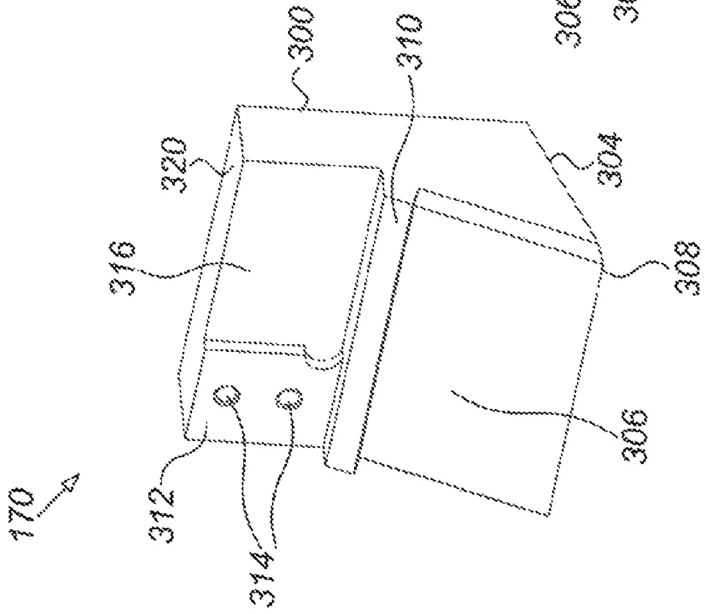

Reference is now made to FIGS. 6A-6C, which illustrate layer thickness uniformizing blade 170. As seen in FIGS. 6A-6C, layer thickness uniformizing blade 170 preferably comprises a block of metal or plastic having a generally flat hack surface 300 from which extends a generally circular disc-like protrusion 302 having a threaded bore 303 formed therein for receiving screw 186, a generally flat bottom surface 304, which is angled with respect to surface 300, and a generally flat blade front surface 306, which is angled with respect to bottom surface 304 and defines therewith a blade engagement edge 308.

Blade front surface 306 terminates upwardly at a crosswise protrusion 310 above which are located locking arm mounting surfaces including an attachment surface 312, including threaded locking mounting arm fastener attachment apertures 314 and a recessed locking arm engagement surface 316. Surfaces 312 and 316 terminate at a blade top surface 320, which is preferably perpendicular thereto and to surface 300.

Figure 7B:
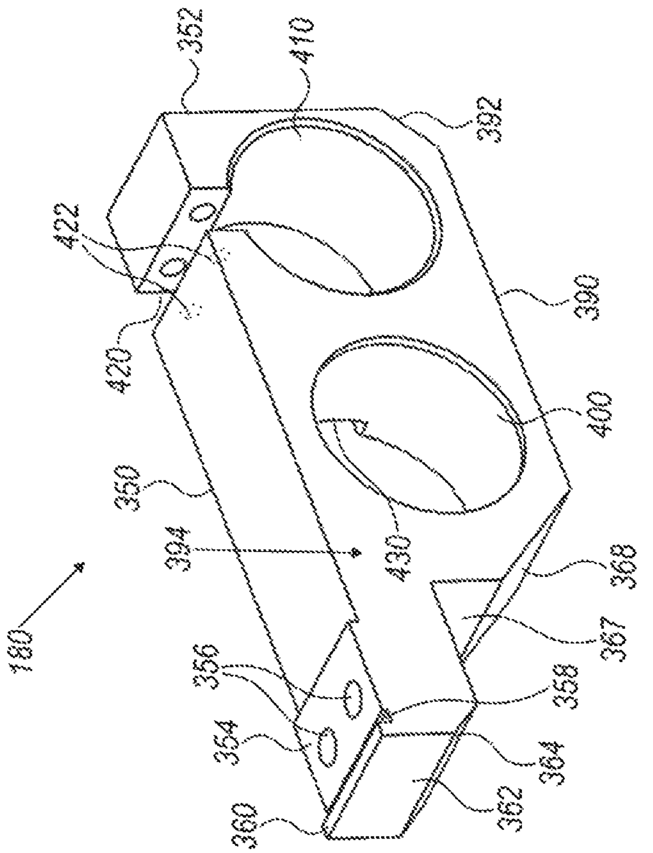
FIGS. 7A and 7B are simplified first and second pictorial illustrations of a blade and electromagnet mounting bracket thrilling part of the layer thickness uniformizing blade positioning subsystem of FIGS. 3A-5C.
Figure 7A:
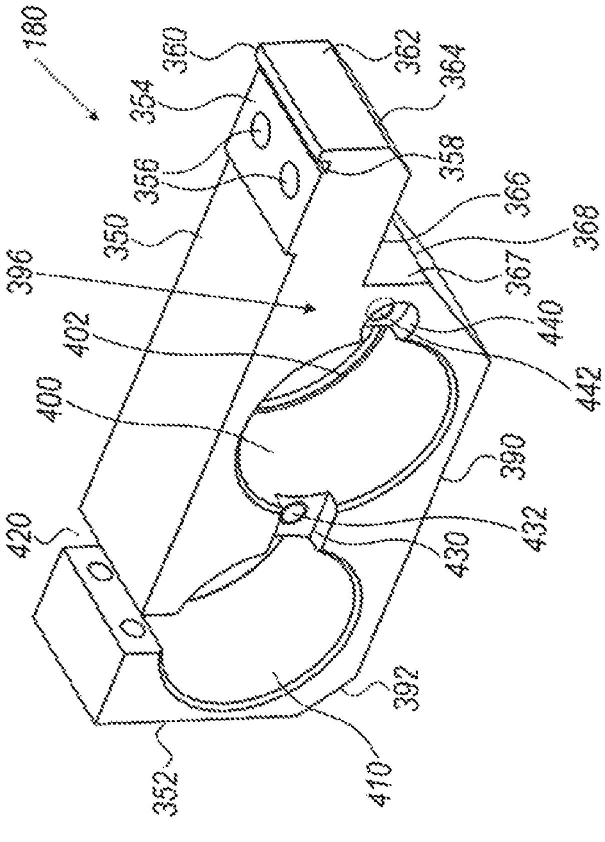

Reference is now made to FIGS. 7A & 7B, which illustrate blade and electromagnet mounting bracket 180. As seen in FIGS. 7A & 7B, blade and electromagnet mounting bracket 180 comprises a generally rectangular block of aluminum, which defines a generally flat top surface 350 which extends from a first end surface 352 to a slightly raised mounting surface 354, generally parallel to top surface 350 and having threaded apertures 356, for mounting the blade and electromagnet mounting bracket 180 onto force sensor 210, via fasteners (not shown). Mounting surface 354 terminates in a channel 358, which is at the level of top surface 350 and separates mounting surface from a raised edge surface 360, which is slightly above the level of mounting surface 354.

Raised edge surface 360 terminates in a second end surface 362, which extends, generally perpendicular to top surface 350 to an inclined surface 364, which, in turn terminates in an intermediate bottom surface 366, which is generally parallel to top surface 350. Bottom surface 366 terminates in a third end surface 367, which, in turn, terminates in an inclined surface 368. Inclined surface 368 terminates in a bottom surface 390, which is parallel to top surface 350. Bottom surface 390 terminates in an inclined surface 392, which terminates in first end surface 352. Blade and electromagnetic mounting bracket 180 is formed with a generally flat front surface 394, seen best in FIG. 7B, and a generally flat rear surface 396, seen best in FIG. 7A.

Blade and electromagnetic mounting bracket 180 is formed with a throughgoing bearing receiving bore 400, having an inwardly directed rim 402 at front surface 394, and being configured for receiving and retaining therein bearings 184. Blade and electromagnetic mounting bracket 180 is also formed with a throughgoing electromagnet receiving bore 410, and being configured for receiving electromagnet 190.

A slit 420 extends between bore 410 and top surface 350. Slit 420 enables clamping electromagnet 190 within bore 410 by tightening the bore via tightening screws, not shown, which engage threaded apertures 422 on opposite sides of slit 420.

A recess 430 extends between bores 400 and 410 and is formed with a threaded aperture 432. A recess 440 is located alongside bore 410 and is formed with an aperture 442. Recesses 430 and 440 and corresponding apertures 432 and 442 are provided for receiving bearing retaining screws, not shown, which retain bearings 184 in place in bore 400 of blade and electromagnetic mounting bracket 180.

Figures 8A, 8B, 8C:
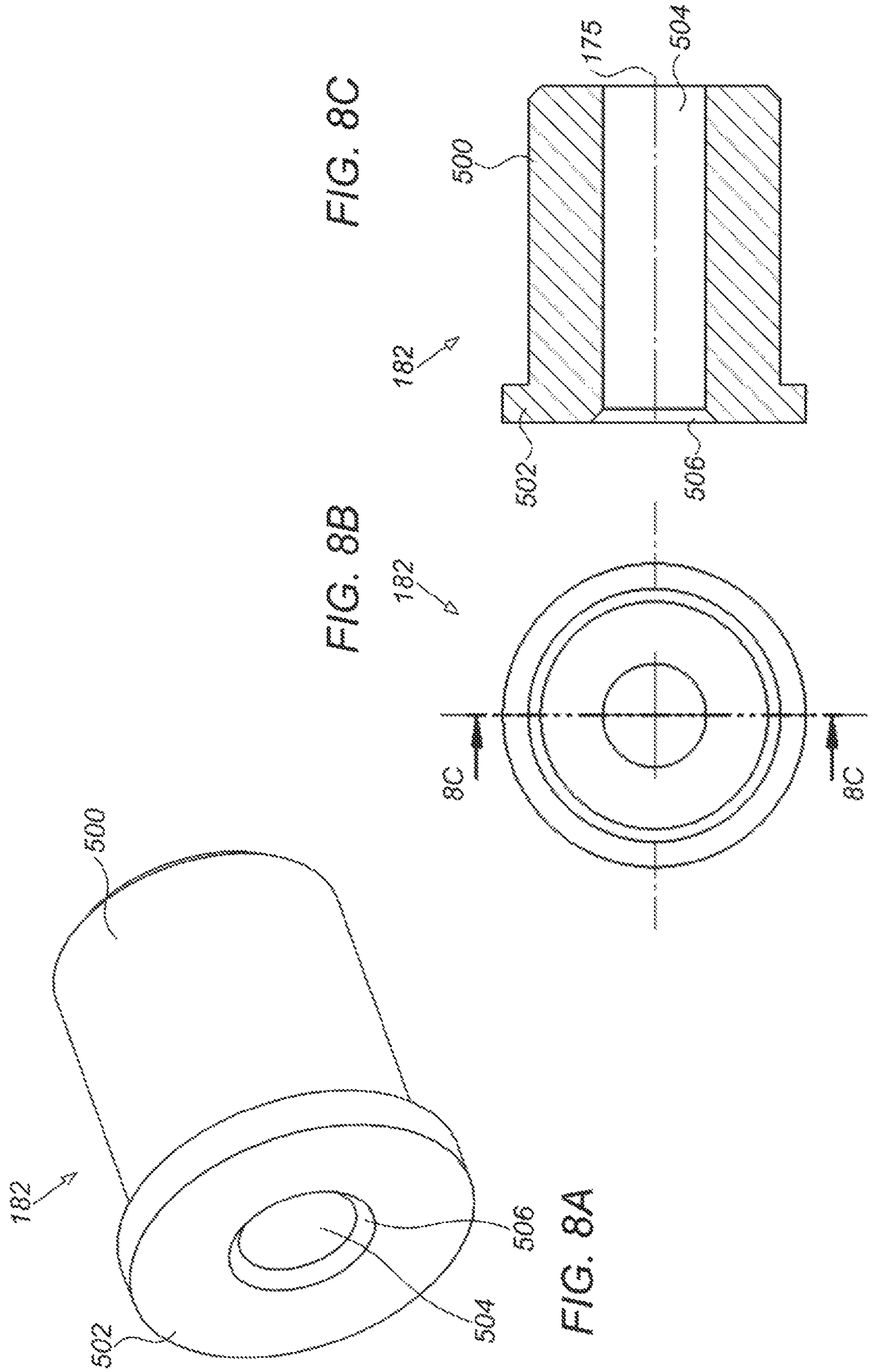
FIGS. 8A, 8B and 8C are simplified respective pictorial, front planar and sectional view illustrations of a blade mounting axle forming part of the layer thickness uniformizing blade positioning subsystem of FIGS. 3A-5C, FIG. 8C being taken along lines 8C-8C in FIG. 8B.

Reference is now made to FIGS. 8A-8C, which illustrate axle 182. As seen in FIGS. 8A-8C, axle 182 is a circularly symmetric generally cylindrical hollow object, preferably formed of aluminum, and has a circularly cylindrical body 500 and an annular flange 502 at a first end thereof. A throughgoing central bore 504 extends through flange 502 and body 500 and has a tapered opening 506 at flange 502. Screw 186 (FIG. 4B) extends through bore 504 and threadably engages threaded aperture 303 of layer thickness uniformizing blade 170.

Figure 9B:
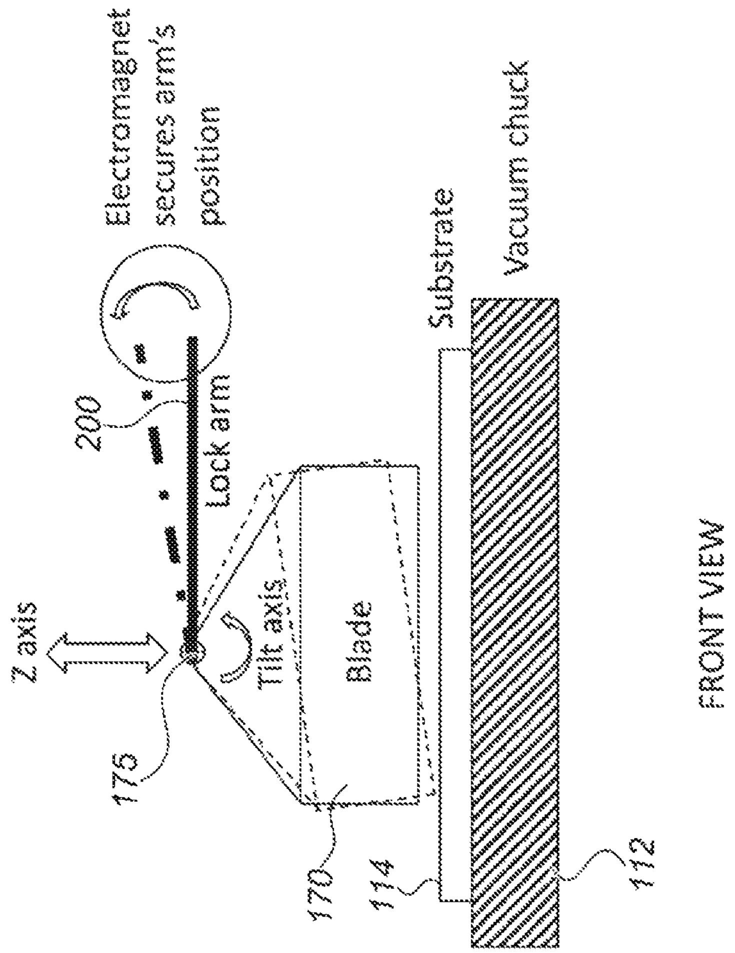
FIGS. 9A and 9B are simplified schematic illustrations of a typical initial step in positioning the layer thickness uniformizing blade relative to a substrate, FIGS. 9A and 9B being taken in mutually perpendicular directions.
Figure 9A:
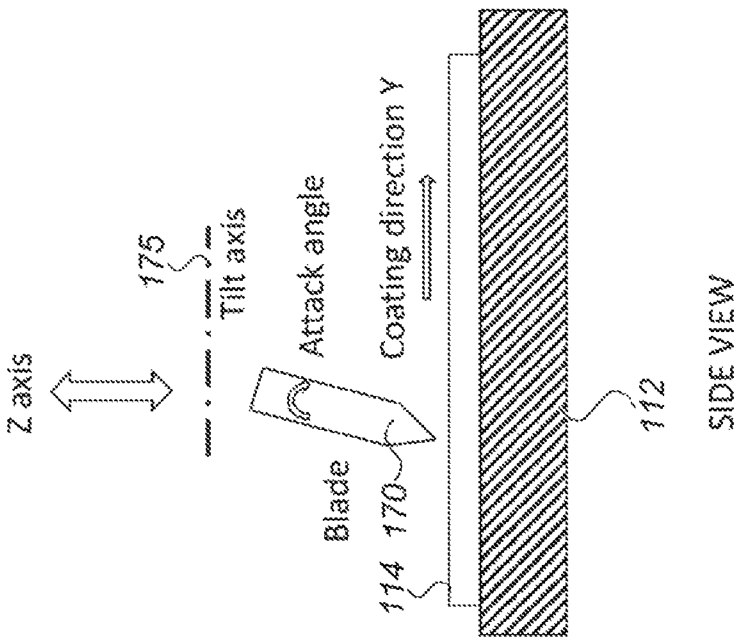

Reference is now made to FIGS. 9A and 9B, which are simplified schematic illustrations of a typical initial step in positioning the layer thickness uniformizing blade relative to a substrate. FIGS. 9A and 9B being taken in mutually perpendicular directions. As seen in FIGS. 9A and 9B, blade 170 is located above and out of contact with substrate 114 and is free to pivot about axis 175 on bearings 184, due to the fact that electromagnet 190 is not operative to lock the position of locking arm 200, fixed to blade 170.

Figure 10:
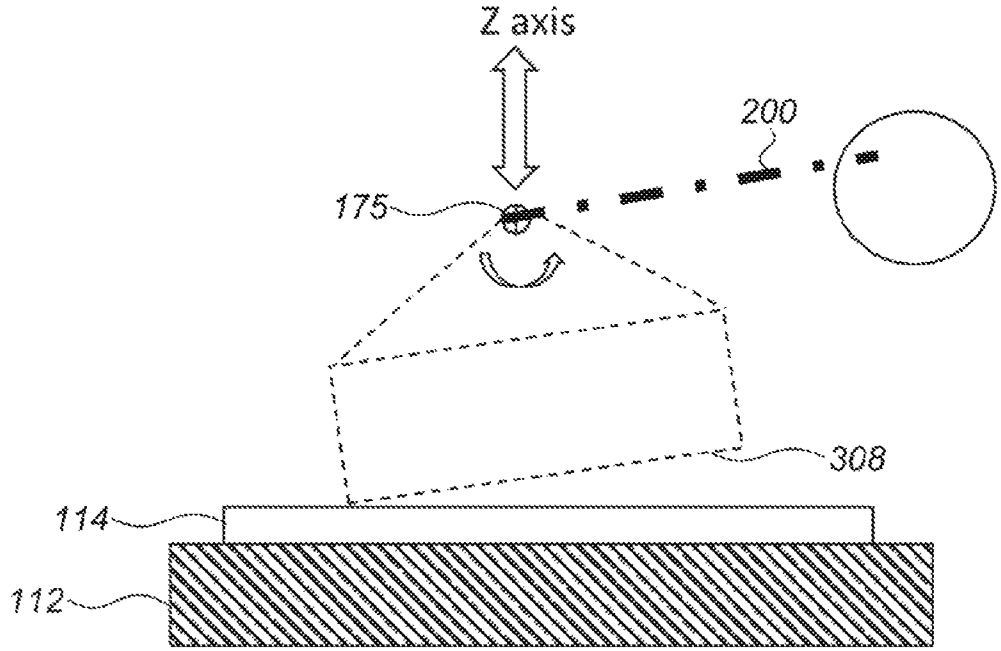
FIG. 10 is a simplified schematic illustration, corresponding to FIG. 9A, illustrating a further step in positioning the layer thickness uniformizing blade relative to a substrate.

FIG. 10 illustrates lowering of blade 170 until blade engagement edge 308 touches substrate 114, typically at a corner of blade 170. Blade 170 remains free to pivot about axis 175 on bearings 184, due to the fact that electromagnet 190 is not operative to lock the position of locking arm 200, fixed to blade 170.

Figure 11:
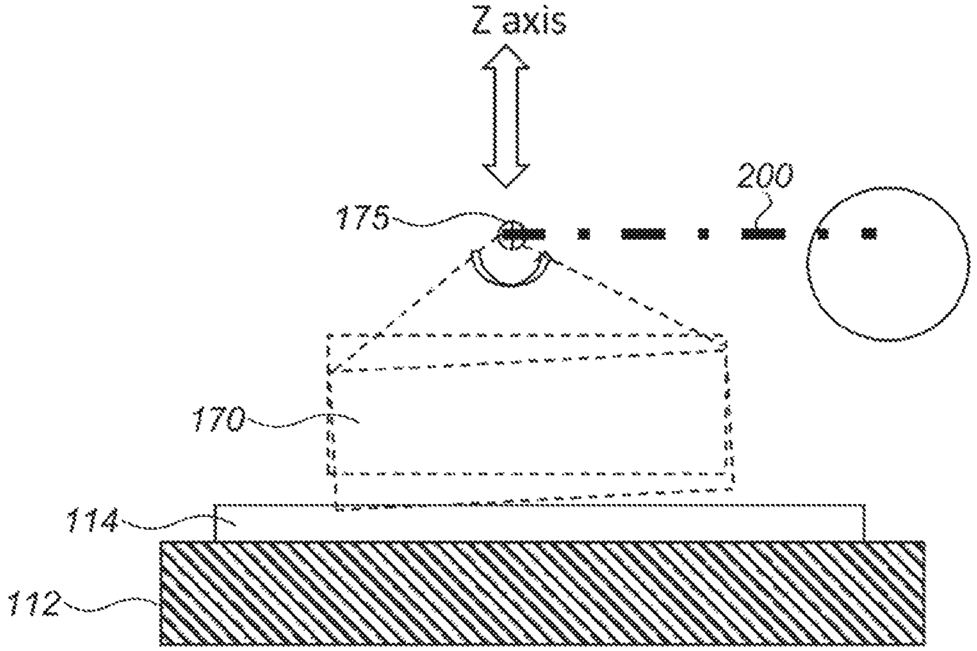
FIG. 11 is a simplified schematic illustration, corresponding to FIG. 9A, illustrating a still further step in positioning the layer thickness uniformizing blade relative to a substrate.

FIG. 11 illustrates further lowering of blade 170 until blade engagement edge 308 lies in parallel touching engagement with substrate 114. Blade 170 remains free to pivot about axis 175 on bearings 184, due to the fact that electromagnet 190 is not operative to lock the position of locking arm 200, fixed to blade 170.

Figure 12:
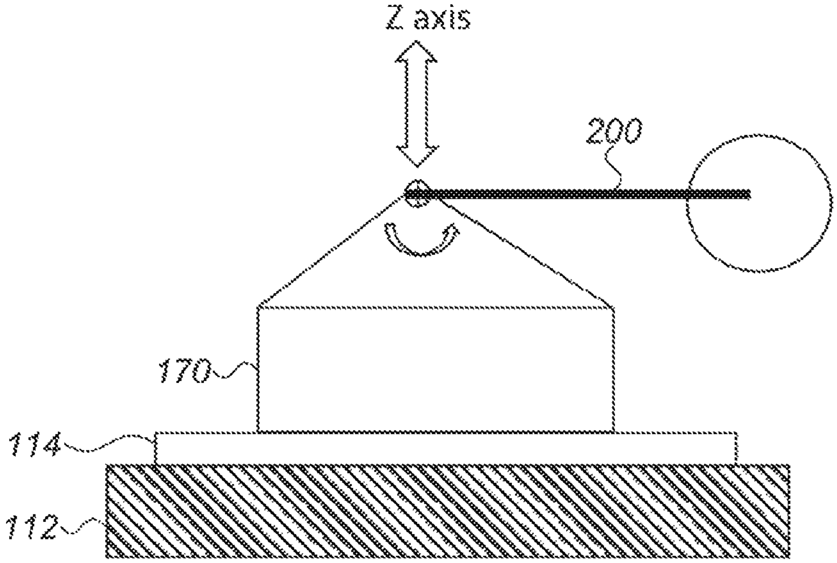
FIG. 12 is a simplified schematic illustration, corresponding to FIG. 9A, illustrating yet a further step in positioning the layer thickness uniformizing blade relative to a substrate.

FIG. 12 illustrates further lowering of blade 170 until the measured force of the blade 170 on the substrate 114, as measured by force sensor 150 is preferably about 150 grams, while lower edge 308 lies in parallel touching engagement with substrate 114 and blade 170 remains free to pivot about axis 175 on bearings 184, due to the fact that electromagnet 190 is not operative to lock the position of locking arm 200, fixed to blade 170.

Figure 13:
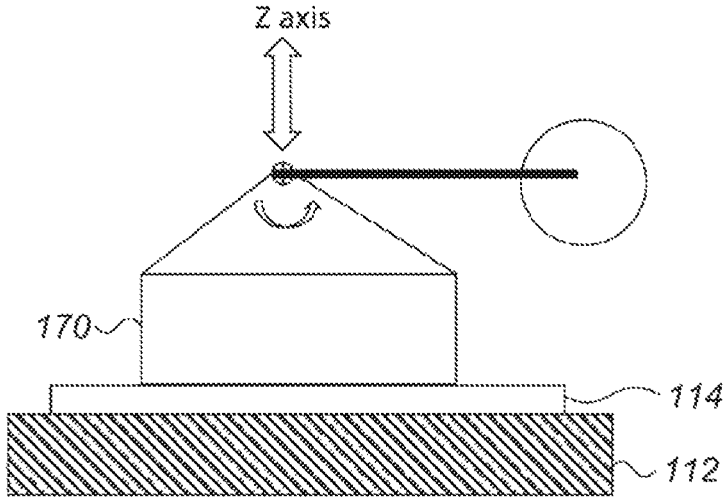
FIG. 13 is a simplified schematic illustration, corresponding to FIG. 9A, illustrating an additional step in positioning the layer thickness uniformizing blade relative to a substrate.

FIG. 13 illustrates locking of the position of locking arm 200, fixed to blade 170, by operation of electromagnet 190, when the blade 170 is in the operative orientation described above with reference to FIG. 12, thereby locking the blade against pivoting about axis 175 and retaining the blade in an orientation about axis 175 where lower edge 308 lies in parallel touching engagement with substrate 114.

Figure 14:
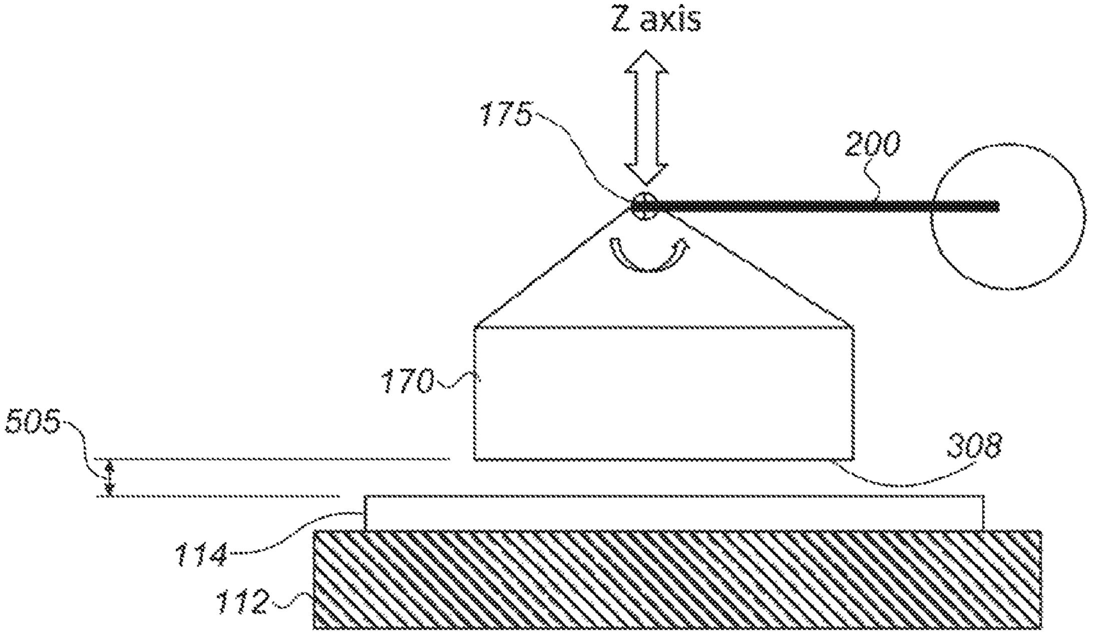
FIG. 14 is a simplified schematic illustration, corresponding to FIG. 9A, illustrating a further additional step in positioning the layer thickness uniformizing blade relative to a substrate.

FIG. 14 shows raising blade 170 and pivot axis 175 along a Z-axis, to define a predetermined desired separation distance 505, typically 2 mm, between blade engagement edge 308 and the substrate 114. The blade 170 is not free to pivot about axis 175 on bearings 184, due to the fact that electromagnet 190 is operative to lock the position of locking arm 200, fixed to blade 170.

Figure 15:
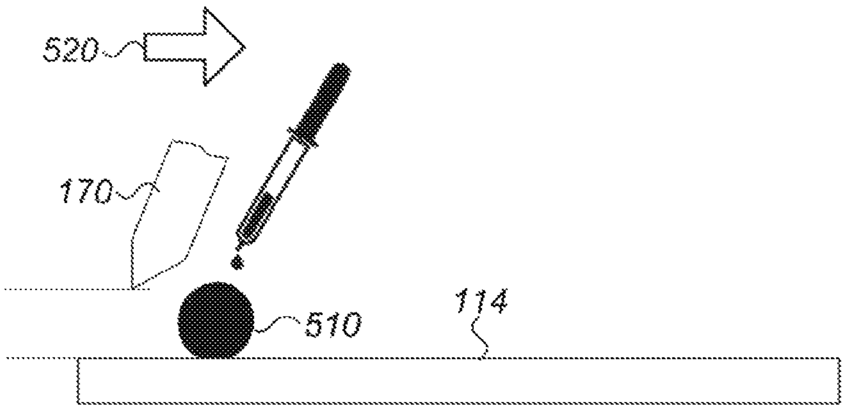
FIG. 15 is a simplified, schematic illustration of a typical initial step in coating substrate with a highly viscous material using the system of FIGS. 1-14.

Reference is now made to FIG. 15, which is a simplified, schematic illustration of a typical step in coating a substrate, preferably a laser radiation transparent substrate, with a donor material, preferably a highly viscous material, using the system of FIGS. 1-14. As seen in FIG. 15, a donor material 510, preferably a highly viscous material, such as Henkel 8143, having a viscosity of 20,000 centipoise, is deposited onto substrate 114, downstream of blade 170, whose direction of movement in along a Y-axis is indicated by an arrow 520.

Figure 16:
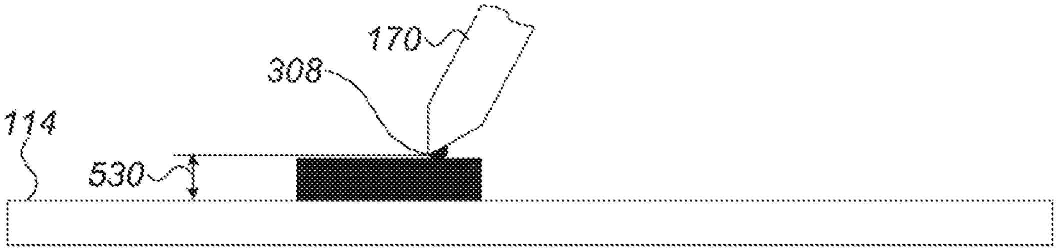
FIG. 16 is a simplified, schematic illustration of a further step in coating a substrate with a highly viscous material using the system of FIGS. 1-14.
Figure 17:
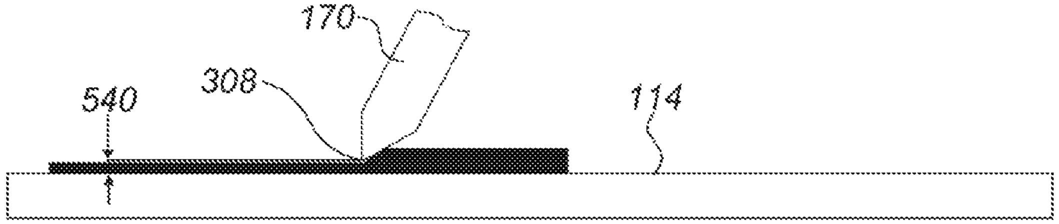
FIG. 17 is a simplified, schematic illustration of a still further step in coating a substrate with a highly viscous material using the system of FIGS. 1-14.
Figure 18:
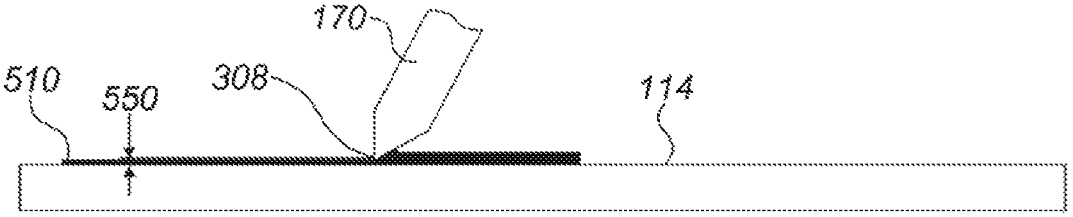
FIG. 18 is a simplified, schematic illustration of yet a further step in coating a substrate with a highly viscous material using the system of FIGS. 1-14.

As seen in FIGS. 16, 17, and 18 multiple passes of blade 170 take place and between each pass, the separation distance between blade engagement edge 308 and the substrate 114 is reduced by lowering blade 170 and pivot axis 175 along the Z-axis, so that typically in FIG. 16, a separation distance 530, typically 1 mm, between blade engagement edge 308 and the substrate 114 is defined, and typically in FIG. 17, a separation distance 540, typically 0.3 mm, between blade engagement edge 308 and the substrate 114 is defined, and typically in FIG. 18 a separation distance 550, typically 0.05 mm, but which can also be as low as 10 μm for lower viscosities of material 510, between blade engagement edge 308 and the substrate 114 is defined corresponding to a desired final thickness of the material 510.

It is appreciated that the separation distances between blade engagement edge 308 and substrate 114 described above, which reduce the thickness of the donor material 510 on substrate 114 to the desired final thickness, are uniform along the entire blade engagement edge 308. As described above, the separation distance varies as blade 170 is lowered relative to substrate 114. By decreasing the separation distance, the thickness of donor material 510 is preferably reduced to a final thickness, preferably between 10 and 2000 microns, defined by the final separation distance.

It will be appreciated by persons skilled in the art that the present invention is not limited to what has been specifically described and shown herein but also includes combinations and sub-combinations of features described herein and modifications thereof which are not in the prior art.

The invention claimed is:

1. A method for coating of a donor material onto a laser radiation transparent substrate having a straight surface portion, said method comprising:

providing a layer thickness uniformizing blade pivotably mounted onto a linearly displaceable blade support about a pivot axis, said blade having a straight edge, wherein the layer thickness uniformizing blade is pivotably mounted on an axle;

initially positioning said linearly displaceable blade support relative to said laser radiation transparent substrate such that said straight edge lies coplanar with said straight surface portion of said laser radiation transparent substrate, wherein said straight surface portion lies along a blade engagement axis which is perpendicular to said pivot axis;

thereafter locking said layer thickness uniformizing blade against pivotable movement relative to said linearly displaceable blade support about said pivot axis;

thereafter repositioning said linearly displaceable blade support and said layer thickness uniformizing blade about a linear displacement axis which is perpendicular to said blade engagement axis and perpendicular to said pivot axis to a position at which said straight edge is separated from said straight surface portion of said laser radiation transparent substrate by a separation distance, which is uniform along said straight edge of said layer thickness uniformizing blade;

applying said donor material to said laser radiation transparent substrate;

providing mutual displacement between said layer thickness uniformizing blade and said laser radiation transparent substrate along an axis parallel to said pivot axis, thereby to reduce the thickness of said initial layer of said donor material; and maintaining said separation distance.

2. The method according to claim 1, further comprising sequentially repeating said repositioning and said providing mutual displacement steps at least once thereby to sequentially reduce said thickness of said donor material.

3. The method according to claim 1, wherein said providing mutual displacement comprises reducing the thickness of said donor material to a thickness between 10 and 2000 microns.

4. The method according to claim 1, wherein said initially positioning said linearly displaceable blade support comprises measuring a force exerted by said layer thickness uniformizing blade on said laser radiation transparent substrate.

5. The method according to claim 1, wherein said initially positioning comprises initially positioning said layer thickness uniformizing blade such that a portion of said straight edge of said layer thickness uniformizing blade touches said laser radiation transparent substrate, while said layer thickness uniformizing blade is free to pivot about said pivot axis.

6. The method according to claim 5, wherein said initially positioning further comprises thereafter lowering said layer thickness uniformizing blade such that said straight edge lies in parallel touching engagement with said laser radiation transparent substrate, while said layer thickness uniformizing blade is free to pivot about said pivot axis.

7. The method according to claim 6, wherein said initially positioning further comprises thereafter further lowering said layer thickness uniformizing blade until a measured force of said layer thickness uniformizing blade on said laser radiation transparent substrate is about 150 grams, while said straight edge of said layer thickness uniformizing blade lies in parallel touching engagement with said laser radiation transparent substrate and said layer thickness uniformizing blade remains free to pivot about said pivot axis.

8. The method according to claim 1, wherein said locking said layer thickness uniformizing blade against pivotable movement relative to said linearly displaceable blade support about said pivot axis is provided by operation of an electromagnet mounted onto said linearly displaceable blade support by attracting a locking arm, fixed to said layer thickness uniformizing blade.

9. The method according to claim 1, wherein said repositioning takes place when said layer thickness uniformizing blade is not free to pivot about said pivot axis.

10. A system for coating of a donor material onto a laser radiation transparent substrate, said system comprising:

a donor material applicator for applying donor material to said laser radiation transparent substrate;

a multi-pass precise donor material thickness determiner for providing a desired thickness of said donor material on said laser radiation transparent substrate and including:

a linearly displaceable blade support;

a layer thickness uniformizing blade lockably pivotably mounted onto said linearly displaceable blade support about a pivot axis, said layer thickness uniformizing blade having a straight edge, wherein the layer thickness uniformizing blade is pivotably mounted on an axle; and a blade position maintainer operative for maintaining said straight edge at a desired separation distance from said laser radiation transparent substrate, said separation distance being uniform along said straight edge of said layer thickness uniformizing blade.

11. The system according to claim 10, wherein said multi-pass precise donor material thickness determiner is configured to produce said desired thickness of said donor material on said laser radiation transparent substrate between 10 and 2000 microns.

12. The system according to claim 10, wherein said linearly displaceable blade support is linearly displaceable perpendicular to said pivot axis.

13. The system according to claim 10, wherein said linearly displaceable blade support also supports an electromagnet.

14. The system according to claim 13, wherein said electromagnet is selectably actuable for locking said layer thickness uniformizing blade relative to said linearly displaceable blade support against rotation of said layer thickness uniformizing blade about said pivot axis when said straight edge of said layer thickness uniformizing blade is positioned at a desired separation distance from said laser radiation transparent substrate.

15. The system according to claim 10, wherein said blade position maintainer includes a force sensor for sensing a force exerted by said layer thickness uniformizing blade on said laser radiation transparent substrate.

16. The system according to claim 10, wherein said linearly displaceable blade support is configured to be linearly displaced between sequential passes to sequentially reduce a thickness of said donor material until said desired thickness is reached.

* * * * *